May 26, 1964 G. T. BROWN, JR 3,134,674
DATA DISPLAY SYSTEM
Filed Jan. 27, 1960 4 Sheets-Sheet 2
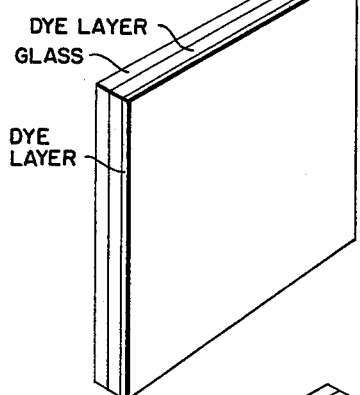
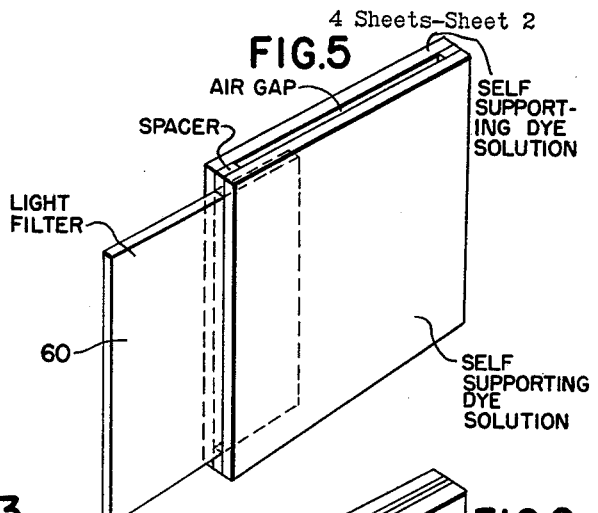
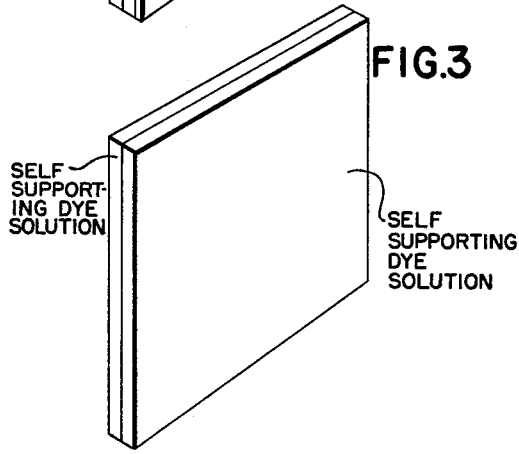
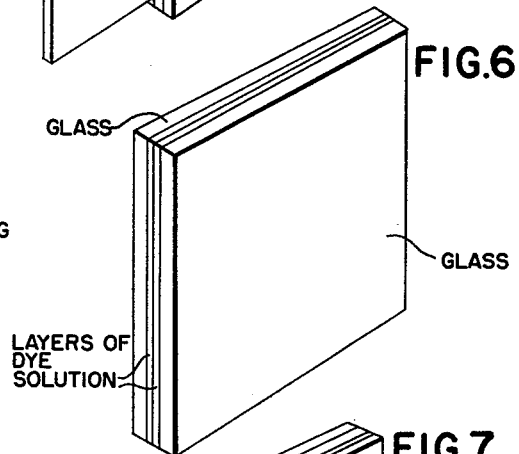
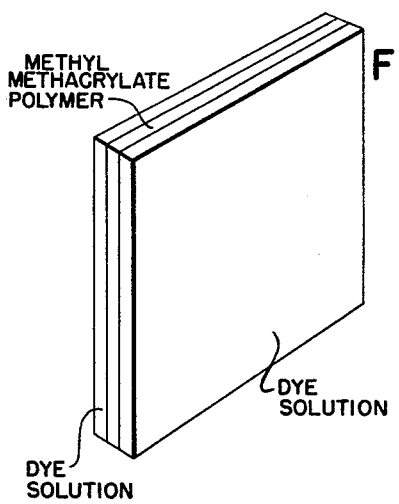
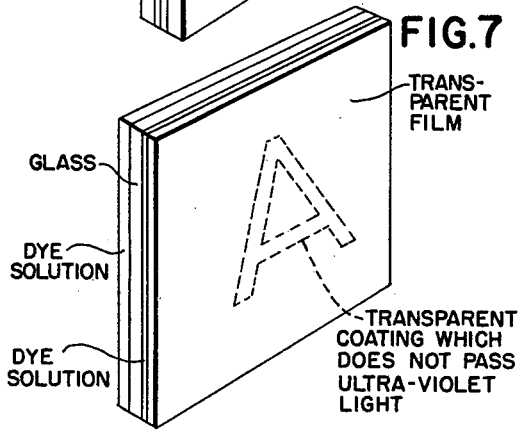
INVENTOR
GEORGE T. BROWN, JR
BY
HIS ATTORNEYS

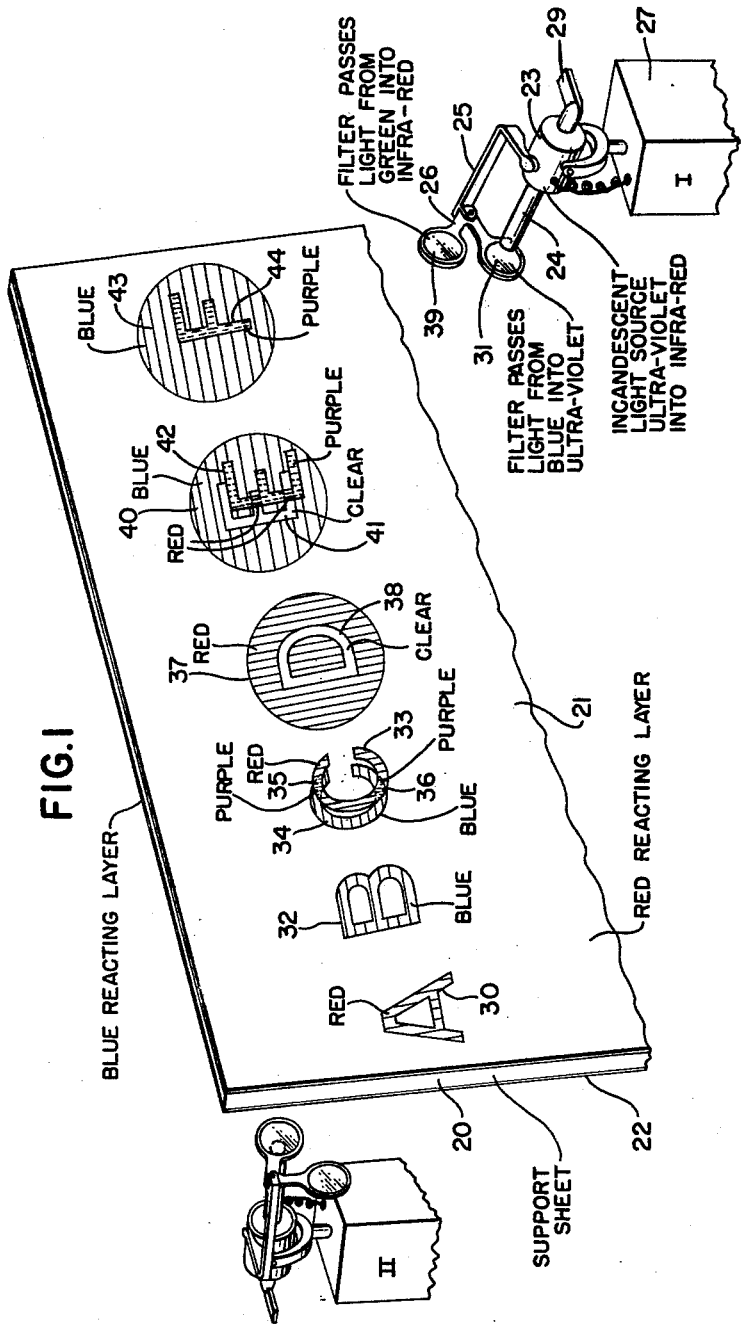

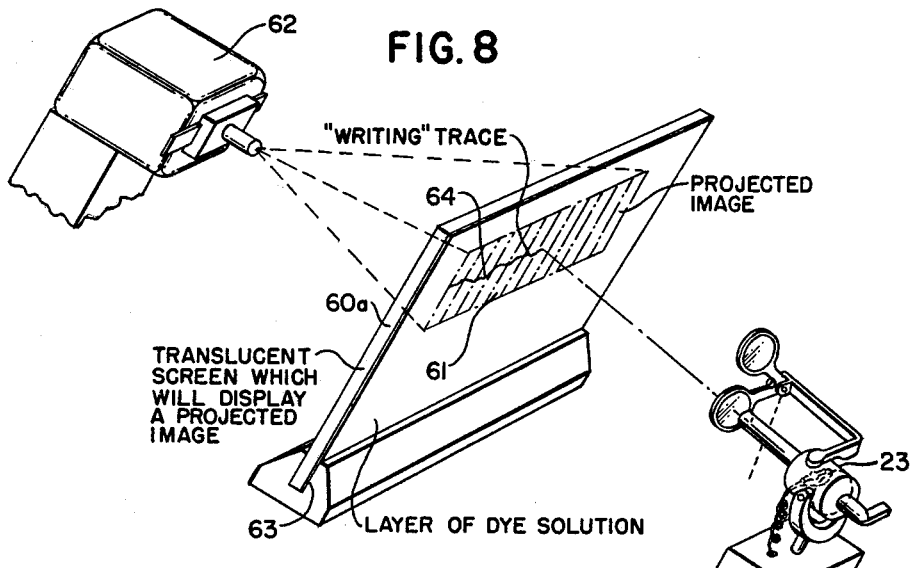
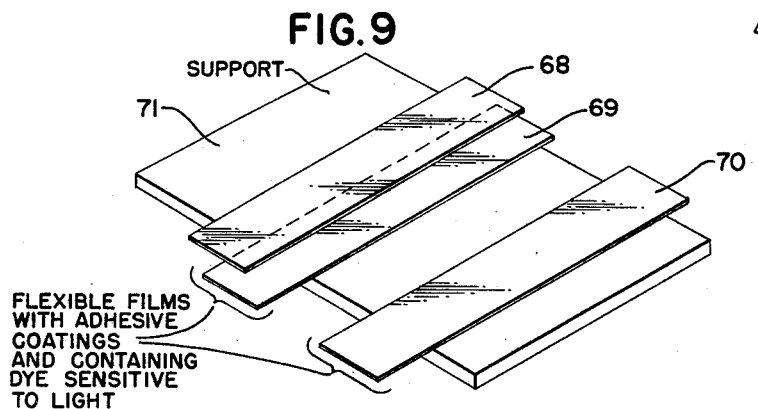
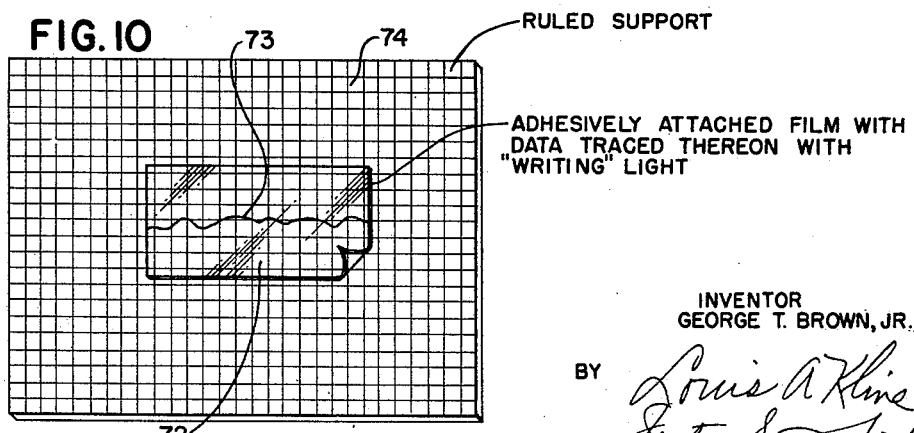

May 26, 1964

G. T. BROWN, JR 3,134,674

DATA DISPLAY SYSTEM

Filed Jan. 27, 1960

INVENTOR
GEORGE T. BROWN, JR.

BY

HIS ATTORNEYS

United States Patent Office

3,134,674
Patented May 26, 1964

3,134,674
DATA DISPLAY SYSTEM
George T. Brown, Jr., Dayton, Ohio, assignor to The National Cash Register Company, Dayton, Ohio, a corporation of Maryland
Filed Jan. 27, 1960, Ser. No. 5,049
26 Claims. (Cl. 96—68)

This invention relates to a substantially transparent data display system utilizing a screen of at least two layers, on the layers of which screen data may be recorded in the same or different colors, according to the sensitivity of the layers, by temporarily subjecting the screen in selected areas on one or both sides to "writing" light characterized by being predominant in wave lengths including blue through the ultraviolet region of the spectrum. The recorded data, which normally persists for a time measured in fractions of a second to months, depending on the dye solutions and the ambient temperature, after application of the "writing" light, is subject to "erasure" selectively, in some cases by flashing the "written" screen with "erasing" light characterized by being predominant in wave lengths including green through the infrared region of the spectrum, in some cases by thermal excitation of one or more of the layers, and in other cases by use of both the "erasing" light and the "erasing" thermal excitation.

The screen is formed, in part, of at least two facing sheet-like layers of superposed material in contact or in closely-spaced relation, self-supported or supported on a transparent or translucent web, each layer including a normally colorless transparent or translucent solution of a dye, or dyes, which may be distinctively colored by being subjected to "writing" light, the dye solutions of different layers being of the same or different hue in the colored form, and, preferably, at least one of the dye solutions, if colored, being rendered colorless when subjected to "erasing" light. The coloration of an area in a layer ordinarily prevents passage of "writing" light, so the screen may be "written on" by projecting "writing" light on one of the layers to record data in the hue associated with the colored form of the dye solution thereon, and "written on" by projecting "writing" light on the other layer to record data in the hue associated with the colored form of the dye solution associated with said other layer, the "writing" on one side not necessarily being alined with or coextensive with the "writing" on the other side, but the "writings" on both sides being visible from one side or both sides of the screen to make a combined visual effect. One or more of the layers may be a flexible film and the other sensitized layer a tacky adhesive coated on the film to enable the film to be attached to a support.

In the preferred form of the invention, the screen includes a supporting web of glass which is transparent or substantially transparent to wave lengths of light extending from the ultraviolet into the infrared region of the spectrum, one side of the glass web being coated with a layer of a clear solution of one dye which responds to "writing" light by becoming colored, and the other side being coated with a layer of a solution of a dye which also responds to "writing" light by becoming colored. By selective choice of areas where the "writing" light strikes the layers, characters or traces may be recorded. Such data may be recorded on the novel screen by use of "writing" light projected through stencils or transparencies, by means of a projected light image, or by moving light beams, separately used or used in combination, as will be disclosed, or by close proximity to a source of light, either incandescent or luminescent. It is contemplated, in this preferred form of the invention, that the dye, or dyes, used in the coatings of one side be of one hue in the colored form, and the dye, or dyes, used in the coatings on the other side be of another hue in the colored form, so that recordings resulting from exposing one layer of the screen to "writing" light are of one hue, and recordings resulting from exposing the other layer of the screen to "writing" light are of another hue. The dyes selected may, in the colored form, vary not only in hue but in the time-persistence of the colored form in the ambient temperature and light environment. The dye solutions in the colored form, as has been said, may be sensitive to "erasing" light extending from green into the infrared portion of the spectrum, so that, when exposed to "erasing" light, they immediately resume the colorless state, and, thus, selected data may be "erased" by exposing the portion of the screen where such data is situated to such "erasing" light. Such "erasing" light generally strikes through and is effective in both layers, as such light is more penetrating through ordinary. transparent materials, and such "erased" areas of the screen are then available for further "writing," as the "writing" and "erasing" phenomena are reversible.

As mentioned, the dyes absorb light from blue into the ultraviolet region of the spectrum to cause their coloration, and such absorption in a layer ordinarily prevents the passage therebeyond of such "writing" light as could affect the dye solution in the other layer of the screen; however, some dyes have such low absorption energy characteristics, or may be so diluted, that some excess of "writing" light is permitted to pass through one layer, coloring it and the other layer behind it. Some of the dyes in solution fluoresce while the "writing" light is applied. It is believed that such fluorescence is a separate phenomenon from the color change.

The colored form of some dyes are resistant to "erasing" light at room temperature or other ambient temperature, so that, when "writing" has been made on the layer containing such dye, it will not be "erased" when exposed to "erasing" light. Where a layer of the screen has a mixture of dye solutions therein, one "erasable" by "erasing" light, under the ambient conditions, and the other not, the erasable one of the solution components of a layer or layers may be "erased" by "erasing" light, regardless of the other components or layers.

Variable intensity of coloration or amount of "erasure" of a given area of the screen may be brought about by controlling the time and intensity of the applied "writing" "erasing" light or "erasing" thermal excitation.

Inasmuch as a given light source, such as an incandescent lamp, can be modulated through a "color" temperature change from a point where it gives light predominating in the blue end of the light spectrum to a point where it gives light predominating in the red end of the light spectrum, such modulations of light can be used to cause a corresponding modulated effect upon the screen. For instance, if a trace, or raster, is being made with an incandescent light source, the trace, or raster, may be varied, by controlling the temperature of the lamp filament, as to whether it is "writing" or "erasing" on the screen. Many kinds of variable filters are available to control the wave lengths of light that may be permitted to pass therethrough and which can be used to modulate a "writing" or "erasing" source of light to obtain a result equivalent to modulation of the light source, and such filter type of light control is shown in the drawings as exemplary, but such is not to be considered as limiting the invention.

Most of the dyes useful in making the novel screen are thermally sensitive, and, although the preferred dyes persist in the colored or colorless form at room temperature for various lengths of times measured in seconds to days, they eventually will revert to a stable colored or colorless form on standing. Generally speaking, the data represented by the colored state of a dye solution may be preserved indefinitely by cooling the solution beyond the point where the dye can revert to the colorless form. Elevated ambient temperature will decrease the persistence of the colored form of the dye solutions, and, by heating the screen to provide "erasing" thermal excitation, recorded data may be erased thereby. Temperature control can be used alone or in combination with controlled ambient light to regulate the persistence of the colored state to any time period desired in any layer.

Repeated quanta of "writing" light projected on a colored area of a layer will cause the data represented to persist as long as such repeated quanta are timed closely enough together to prevent spontaneous reversion of that area of the screen to the colorless condition in the ambient environment. Although a weak quantum of "writing" signal may of itself be insufficient to color an area appreciably, closely-timed repetitions of superimposed quanta of signals can have a cumulative effect on the area to color it. In regard to "erasing" signals, the cumulative effect also prevails.

In this application, the term "solution" is used to designate a homogeneous mixture of one liquid with another, of a solid and a liquid, or of a solid and a solid. In the event that the solution is a liquid and is dryable to form a thin non-self-supporting film, the beforementioned glass support may be used and such solution applied to either or both sides thereof and dried. Such films may have an adhesive applied to one or both sides, which adhesive may be a component of a dye solution or contain such a solution to form a second layer that is sensitive in the manner described. Two layers may be applied to one side of a support in superimposed relation, if desired. The solid solutions, if not applied to a transparent support, may be made of such thicknesses as to be self-supporting, and several such films may be constructed to form a laminated screen, with the laminations spaced or not, without the necessity for a transparent supporting medium. On the other hand, the described films may be flexible, with a tacky coating, so as to be removable from a support on which the colored data was "written" and applied to another support, which may have data thereon already, so that the film-carried data is superimposed on the data of said other support.

With respect to non-film-forming solutions which remain liquid under ordinary conditions, they may be microscopically encapsulated, as by the process set out in United States Patent No. 2,800,457, which issued on July 23, 1957, on the application of Barrett K. Green and Lowell Schleicher, and the capsules, which, being made of gelatin and gum arabic, are sufficiently translucent to pass "writing" light and "erasing" light and contain such solution, or solutions, may be coated on a transparent or translucent support to constitute a film-like layer thereon. The capsules may be tinted or the layer of them overcoated with a light-screen material, tinted or not, to improve the background effect of incident or transmitted viewing light.

In the event capsules are used as a coating on a transparent support, they may be treated by inclusions in the capsule walls so that they have a light-scattering effect, such acting to make apparent an image projected thereon by light, so that the effect of the color change in the capsule layer caused by "writing" or "erasing" light can be combined with an image projected thereon by a visible light-image projection device.

The same light-scattering can be obtained by the provision of a transparent support coated with tiny spherical or lenticular particles of light-scattering or light-concentrating material such as glass "beads" used in conjunction with capsule coatings or continuous film coatings. A ground glass support may be used in combination with the dye solutions with or without additional light-scattering coating. The transparent support can be made frosty in appearance, when struck by visible light, in any manner not interfering with the translucency of the screen as a whole, to create the light-scattering characteristic.

The dyes which are used to form the colorable solutions normally are crystalline solids and may be dissolved in a number of evaporable or non-evaporable liquids, some of which will be specified. In solution, these dyes have the property of being molecularly rearranged internally to a "colored" or an "uncolored" state when subjected to light, in a reversible manner. The "colored" state absorbs incident visible light to evidence color to the observer by reason of such characteristic light absorption, and the other state is substantially visibly colorless by reason of a change of its light absorption characteristics. The "colored" state is brought about by exposing the dye solutions to light predominating in ultraviolet and near-ultraviolet components, and such "colored" molecules are reversed to the normal "colorless" state when exposed to green through infrared components.

The color of a dye solution, in the colored form, varies, in a large number of dyes, according to the polarity of the solvent, the more polar the solvent the nearer its absorption band being to the blue end of the visible spectrum. This characteristic is of value in selecting desired color combinations by use of the same dye in different solvents. The conditions of reversibility of the compounds in solution, from one state to the other, in response to thermal excitation, varies, some tending to revert from the colored state to the colorless state at ordinary room temperature within a short time, while others persist in the colored state at room temperature for quite some time, measured in minutes to days, the reversion always being hastened by an increase of the ambient temperature. The colored state may be made to persist indefinitely by lowering the temperature of the screen, and some dyes can be maintained colored only at lower than room temperatures in the absence of continuing exposure to ultraviolet radiation.

By spacing the layers of dye solution of a screen a distance apart, a three-dimensional effect may be had, in that data on one layer will seem to shift relatively to data on the other layer as the viewing point changes. This apparent relative shift of recorded data may be of some importance if the position of data on the screen is of significance, as, for instance, where recorded tracings on one layer are compared relatively to recorded tracings on the other layer. If the images on the two layers are of the same subject matter but in different colors, an anaglyph image can be made and enhanced through the spacing of the layers.

Sometimes it may be desirable to have the dye solutions, or the support for them, tinted with a background color to make the "writing" thereon more outstanding because of increased color contrast. Auxiliary background or foreground light control screens may be used in conjunction with the novel screen to visually modify the data thereon.

If it is desirable to prevent unabsorbed incident "writing" or "erasing" light from passing from one layer of the screen to the other, filtering materials may be positioned between the layers, as by use of a support of material that will not pass the "writing" or "erasing" light, as desired.

The "writing" and "erasing" feature of the two layers of the screen of the preferred embodiment can be used in a reversible sense by first "writing" or "erasing" on either layer of the screen in selected areas and then modifying the so-recorded data by a further sequence of selective "erasures" or "writings" on either layer to obtain desirable composite effects. For instance, if the coating on one layer of the screen when "written on" is blue and the coating on the other layer of the screen when "written on" is red, and both layers of the screen are thereby colored over a selected area, erasures can be made on one layer of the screen to reveal the color of the other layer, or vice versa, or both layers of the screen may be erased, if the dyes are of that character, so as to leave a clear portion, the clear portions on the different layers of the screen not necessarily being in complete register, so that a composite recording of data can be made wherein portions of the screen appear by transmitted light in a composite effect of the red and blue, or of the red alone, or of the blue alone, or as clear areas, or their combinations.

While mention of red and blue colorations have been made, such was only for exemplary purposes, as many colors are available, both as to hue and as to mixtures thereof. Glass has been mentioned as a support material, but there are many obvious light-transmitting film substitutes therefor, such as polymethyl-methacrylate, polystyrene, and the like, that will transmit the necessary wave lengths of light. It will be understood that it is not necessary that a support material transmit the "writing" light, but it is desirable that the support material pass some or all visible light if it is necessary to see the data on the two coatings by light passing through the support. In the same sense, if solid self-supporting layers are used, the transmission of viewing light, "writing" light, and "erasing" light therethrough comes of importance and can be controlled by various filtering expedients.

In the event that one or more of the layers contains the colorable dye in it or on it in such physical state that it may migrate in the layer, as occurs with a dye print in a hectograph mat, any printed data on or in such layer may be attenuated by such migration, in the course of time, and, due to such migration and to "erasure" brought about by the ambient temperature, will substantially disappear to, in effect, provide a new "writing" area.

Another aspect of the invention is that, if the layer containing the light-colorable dye is of a type in which the mentioned migration occurs, a print of data may be made thereon by light of such intensity that the dye, while showing the print, is so modified or is so destroyed that the uncolored state may not again be attained by subjecting it to "erasing" light, yet the print will disappear because of such outward migration of the old dye, the area being simultaneously resensitized by migration of still-active dye into the area, thus being self-regenerative.

With the foregoing objects of the invention, and other objects, which will become manifest in the specification to follow, in contemplation, the invention will be described with reference to the drawings, in which:

FIG. 1 is a perspective and simplified view of a screen including a supporting sheet having a layer of dye solution on each surface, the screen being shown located between two light sources each being adjustable to project either "writing" or "erasing" light onto the screen, one of the layers assuming a first hue, by incident viewing light, when colored by "writing" light, and the other layer assuming a second hue distinctive from the first hue when colored by "writing" light.

FIG. 2 is a perspective view of a screen consisting of a supporting sheet of glass having two layers of dye-containing material on one side.

FIG. 3 is a perspective view of a screen consisting of two self-supporting sheets of material having in solution therein an associated dye.

FIG. 4 is a perspective view of a screen consisting of a supporting sheet of glass having two layers of dye solutions, one on each side thereof.

FIG. 5 is a perspective view of a screen consisting of two spaced self-supporting layers, each containing a colorable dye.

FIG. 6 is a perspective view of a screen consisting of two layers of dye-containing material superimposed and supported between two glass plates.

FIG. 7 shows a supporting glass plate having a layer of dye-containing material on each side, one of the sides being covered with a transparent film having data thereon in a transparent coating which will not pass "writing" light, the latter coating acting as an invisible stencil.

FIG. 8 shows a screen capable of displaying an image of projected visible light and having a dye-containing layer colorable by ultraviolet light so that the data "written" by ultraviolet light may be superimposed on the projected image.

FIG. 9 shows a support on which are positioned flexible films with adhesive coatings which contain in the film or coating the light-responsive dye and which, after being impressed with "writing" light, may be stripped from the support and attached adhesively to another support.

FIG. 10 shows one of the film strips of FIG. 9 with a trace made thereon, with "writing" light, adhesively attached to a background ruled in squares.

Figure 11:
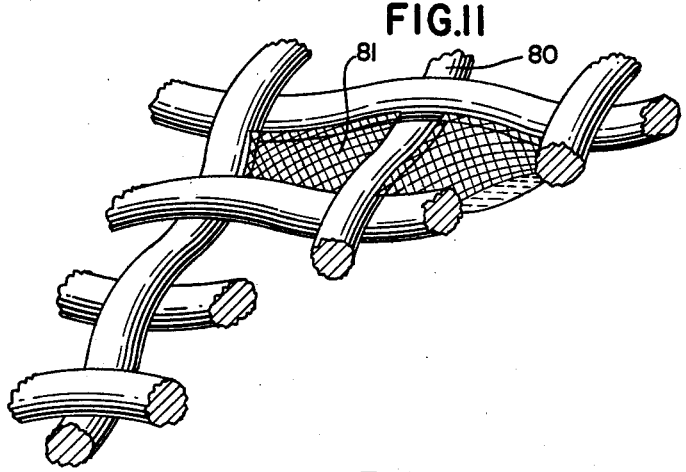
FIG. 11 is an enlarged diagrammatic showing, in perspective, of a screen layer consisting of a mesh of woven filaments having capillary openings holding a liquid solution of the selected photochromic dye.

The various ways in which the system operates will now be described before specifying how the different layers are made.

In FIG. 1 is shown a support 20, of plate-like contour, which support passes visible light and infrared light, and, if special materials such as polymethyl-methacrylate polymer are used, it will also pass ultraviolet light sufficiently to "write." On one side of this support 20 is a coating 21, which acts as one layer of the screen. This coating may be a continuous film containing droplets of the particular dye to be used, or it may be of the capsular type. It is possible to mix different color-responsive capsules in the same coated layer, the composite effect on the eye giving a color-blend. Likewise, the droplets in a film may be of different kinds as regards color-response or persistence in the colored state. Both types of coatings have been mentioned and will be dealt with later. In this exemplary showing, it is to be assumed that the dye solution turns red under the influence of ultraviolet light and becomes colorless when "erased' with infrared light. On the rear side of the screen is a coating 22, of either the continuous or the capsular type, which turns blue when exposed to ultraviolet light and is substantially colorless when "erased." On a standard I, mounted for universal movement, is an incandescent lamp 23, with a projector 24. Attached to the lamp 23 is a bracket 25, on which is pivoted a frame 26, in which are mounted two light filter elements, one passing "erasing" light in the green through infrared region of the light spectrum, and the other passing "writing" light from blue into the ultraviolet region of the light spectrum. The frame 26 may be turned to position the desired filter in front of the projector. It will be apparent that the showing of the light source is diagrammatic. It is the intention to indicate a lamp that can direct a beam of "writing" or "erasing" light in the desired trace pattern onto the front layer 21 of the screen by hand manipulation, using the handle 29. On standard II are a lamp and filters similar to those shown on standard I but so positioned that a beam may be directed in the desired trace pattern on the layer 22. Means for connecting the lamps to a power source and for disconnecting them from the power source have been omitted as unnecessary to an understanding of the invention. Six typical "writings" of data, including "erasures" with respect to two of them, are shown. It must be kept in mind that these "writings" are not visible except for incident light, whether reflected or transmitted. One exception is that some of the photochromic dyes fluoresce as they are exposed to "writing" light, and such fluorescence can be seen in the dark, but it does not persist. It is to be assumed that the incident light is ordinary white light, such as sunlight, or artificial light having a similar balance of spectral wave lengths. The letter 30 has been written on the layer 21 by a beam of light emanating from the lamp on standard I, using filter 31, and is red in color, as indicated by the symbolical vertical ruling. The letter 32 has been "written" on the layer 22 by a beam of light emanating from the lamp on standard II using the "writing" filter. It is noted that there is no counterpart of letter 30 on layer 22 and no counterpart of letter 32 on layer 21, indicating that the "writing" light has not penetrated through from one layer to the other, and this may be due either to the fact that the "writing" light will not pass through the support 20, or to the fact that, if the support 20 is of a nature that will pass the "writing" light, it is not strong enough to pass the colored image which it has created. Letter 33 has been "written" on layer 21, and letter 34 has been "written" on layer 22, in exact registry when viewed straight on. However, FIG. 1 is in perspective, and the thickness of the support 20 will give the viewer an anaglyph, or offset, effect in two colors. If viewed by transmitted white light, portions 35 and 36 will be seen as purple. The disc 37 has been "written" on the layer 21 by the lamp on standard I and, hence, is red, but the uncolored letter 38 has been "erased" therefrom by the same lamp by use of the "erasing" filter 39. The disc 40 was "written" on the layer 22 by the lamp on standard II, the letter 41 having been "erased" therefrom by the lamp on either standard I or II as the "erasing" light passes through the support sheet 20. The letter 42 subsequently was "written" on the layer 21 by the lamp on standard I to give an anaglyph, or offset effect. The letter 41 could not have been "erased" after the letter 42 was "written," as part of the letter 42 would have been "erased" by the through penetration of the "erasing" light. The disc 43 was "written" by the lamp on standard II, and the letter 44 was "written" by the lamp on standard I, giving, by transmitted light, a purple letter 44 on a blue disc 43. In FIG. 2 is shown a screen having a supporting web of glass and two dye-containing layers on one side thereof not of the same thickness, whether they be of the continuous-film type or of the capsular type, but the dyes in the different layers are of different hue in the colored state. FIG. 3 shows a screen consisting of two self-supporting films or sheets of solid dye solution rendering different colors. FIG. 4 shows a screen of the general type shown in FIG. 1, except the center support sheet is polymethyl-methacrylate, which passes ultraviolet "writing" light as well as "erasing" light, so, if the "writing" light impressed on one layer is more than the "written" image on that side can absorb, it will make a similar image in a different color on the other layer at the same time. FIG. 5 shows two self-supporting sheets of dye solution in face-to-face relation but spaced apart so that better anaglyph results can be obtained, or so that filters or image transparencies may be inserted. The filter 60 may have dichroic or light-interference characteristics to pass one wave length of light and reflect another, be it in the "erasing" or in the "writing" region of the spectrum. FIG. 6 shows two layers of dye solution film in contact sandwiched between two protective glas sheets. FIG. 7 shows a glass support plate having a layer of dye solution on each side and having on the outside of one of the layers a light-transparent sheet with a letter coated thereon with a solution which prevents the passage of ultraviolet "writing" light, so that it acts as a negative stencil. If such sheet is entirely coated with the ultraviolet-light-absorbing solution, it will protect the screen from premature coloration due to stray "writing" light striking on that side of the screen and will not interfere with viewing light. Such blocking material may include, as the "writing" light absorber, the compound 2,2'-dihydroxy-4-methoxy benzophenone. A cut-out stencil of opaque material placed before the screen would accomplish the same purpose in a negative manner; i.e., to make a true image, on the screen, of the cut-out portion of the stencil.

FIG. 8 is a variation of the invention in which a light-scattering support screen 50a is provided, so that an image 61 may be projected thereon with an image projector 62. The screen is provided with a layer of dye solution 63, and a trace 64 may be made on the layer with the projected image as a background, by a "writing" beam from a lamp like the lamp 23 of FIG. 1.

FIG. 9 shows another variant of the invention consisting of pieces of flexible transparent or translucent film 68, 69, 70, either the film or the coating or both having dissolved therein the photochromic dye of choice. These may have data recorded thereon by means of ultraviolet light selectively controlled by a moving light beam or a stencil, as has been described. For convenience, these strips are shown stored on a support 71, with the ends extending over the sides of the support. After data has been "written" on one of these strips, it may be peeled off and used adhered against whatever background may be desired. FIG. 10 shows one such strip 72 bearing a data trace 73 adhered to a cross-ruled support 74 whereby the data represented by the trace may be evaluated. The flexibility of the strip permits of its attachment to a curved support.

The flexible adhesive-backed strips, like strips 68 and 69, may be stacked one on the other to form a pad which may be "written" on to show the data on the topmost strip. This topmost strip may be peeled off to expose a new strip which may be "written" on. These peeled-off strips may be applied, as desired, to other surfaces.

The display screen system and its operation having been described, and various forms of the invention and the uses thereof also having been described, the method of making such screens will be described next.

PHOTOCHROMIC CAPSULE COATING

*Example I*

This coating, which is not self-supporting, consists of minute liquid-containing capsules, preferably smaller than can be resolved individually by the unaided eye, the coating being applied to a transparent or translucent support sheet such as clear or frosted glass, or equivalents such as solid polymer sheets or films of polymethylmethacrylate, polystyrene, nitrocellulouse, or cellulose acetate. The capsules are used in such profusion that, as far as the eye can discern, the coating appears as a continuous structure. The capsules preferably are microscopic in size, having an average largest dimension of from 5 to 50 microns. The liquid nuclei of the capsules are solutions of the photochromic dye, or mixtures of dyes, which in the colored form give evidence of their color when subjected to visible light because they transmit or reflect component wave lengths which are not absorbed. In some photochromic dyes, the colored form fluoresces when subjected to ultraviolet light of certain wave lengths. The best method of making such capsules is by providing an equilibrium mixture of a manufacturing liquid vehicle, a rich sol of a hydrophilic colloid film-forming material, and an oil solution of the photochromic type. As a specific mixture, 10 grams of powdered acid-extracted gelatin, 10 grams of powdered gum arabic, 880 grams of water, and 80 grams of a solution of a 1 percent, by weight solution of the 6'-nitro derivative of 1,3,3-trimethylspiro (2'H-1'-benzopyran-2,2'-indolene), having the structure

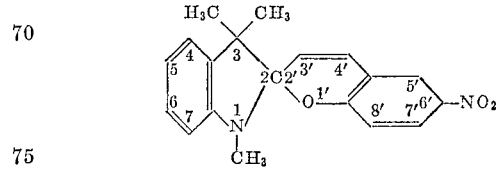

in trichlorodiphenyl are combined at 25 degrees centigrade to form a dispersion of solid and liquid particles, adjusted to pH 4.5. This dispersion is agitated until the dye-containing solution reaches a drop size of the desired dimensions, which preferably is about 25 microns. With continued agitation, the system is heated to about 55 degrees centigrade over a period of several hours to cause complex entities of gelatin and gum arabic to form in a liquid sol state, which entities will by collision and attraction collect on and coalesce around each drop of dye solution, and then the system is cooled to 25 degrees Centigrade with continued agitation over a period of six hours, during which additional complex sol material collects on the drops to form thick walls. At the end of the cooling period, the deposited liquid sol material has set to a firm condition around each droplet of dye solution which remains as a liquid. The walls of these capsules may, if desired, be hardened to a state in which the walls are water-insoluble and resistant to melting by heat, by being treated with a solution of glutaraldehyde, by the addition of 20 milliliters of a 25 percent, by weight, aqueous solution of the glutaraldehyde, stirred in the solution for several hours. The capsules may be recovered from the residual aqueous manufacturing medium and used as desired for a coating on the selected transparent or translucent supporting sheet. The dispersion of capsules in the liquid manufacturing vehicle itself may constitute a liquid coating which may be applied to and dried on the support sheet, the water content being adjusted to make a coating of the right viscosity under the conditions of use. If the capsules are recovered as apparently dye entities, they may be dispersed in any neutral coating medium which it is desired to use, and the coating medium may itself be colored or act as a light filter the color of which visually mixes with the colored form of the dye. The particular photochromic dye used normally is colorless in the solution in the capsules but turns to the colored form when the capsules are subjected to the "writing" light, which has been specified, such colored form of the mentioned 6'-nitro-spiropyran compound evidencing itself as a dark blue visible color by transmitted light. During the establishment of the blue color of this compound, it will fluoresce with a pinkish color until the established blue color overwhelms it from a visual standpoint. Inasmuch as the capsules are, themselves, individually visually undetectable but act as light-scattering particles by reason of surface reflection or by dispersion of transmitted light, the coating binder may be selected to have a light-refractive index substantially equivalent to that of the capsule wall material to prevent such phenomena, such practice being well understood in the optical art, where fibers and other light-scattering inclusions in a film or sheet are effectively rendered invisible by such leveling-out of the refractive index of the sheet or film as viewed in visible light.

Other methods of making liquid-containing capsules of minute size which are adapted for use in the encapsulation of water-immiscible solutions of photochromic dyes are disclosed in United States Patent No. 2,800,457, which issued July 23, 1957, on the application of Barrett K. Green and Lowell Schleicher, and United States Patent No. 2,800,458, which issued July 23, 1957, on the application of Barrett K. Green. Various water-immiscible liquids other than the trichlorodiphenyl may be used, and their solutions with the photochromic dyes may be solids at the temperatures at which the screens are used, but such solid solutions also may be photochromically reactive.

Other solvents than trichlorodiphenyl suitable for a number of the dyes which will be specified as preferred equivalents are toluene, benzene, diethyl-benzene, petroleum distillate, methyl salicylate, cod-liver oil, castor oil, sperm oil, olive oil, ligroin, and in general solvents for oil-soluble dyes. Some of these may solidify at temperatures at which they are to be used in the novel screen.

As to the colors of various specific dyes, the mentioned 6'-nitro-spiropyran compound, the structure of which has been given, when dissolved in chlorinated diphenyl, is of a dark-blue hue in the colored form. If dissolved in a polar solvent such as ethanol or tributyl citrate, this compound is of a red hue in the colored form. It is a general characteristic of the compounds set out in the patents that have been referred to, that in polar solvents the colored form is in the red region of the spectrum, and in non-polar solvents the colored form is in the blue region of the spectrum. Methanol, iso-propyl alcohol, and butanol are considered polar solvents, while those previously named are considered non-polar solvents. Some compounds, disclosed in the applications listed, which follow, for instance, 7-nitro-spiro-xantho-10,2' (2'H-1'-benzo-betanaphthopyran), are, in the colored form, in non-polar solvents of a red hue. The compounds recited in United States patent application Serial No. 827,463, filed on July 16, 1959, by Elliot Berman and David B. McQuain, in the colored form in non-polar solvents are of a purple hue but are of a yellow or orange hue in the colored state when dissolved in polar solvents.

In addition to the 6'-nitro-spiropyran compound specifically mentioned, thousands of other photo-chromic dye compounds are specified in the following applications for United States Letters Patent:

Serial No. 654,578, filed April 23, 1957, by Elliot Berman
Serial No. 803,836, filed April 3, 1959, by Elliot Berman
Serial No. 821,383, filed June 19, 1959, by Elliot Berman and David B. McQuain
Serial No. 827,175, filed July 15, 1959, by Elliot Berman and David B. McQuain
Serial No. 827,420, filed July 14, 1959, by Elliot Berman
Serial No. 827,462, filed July 16, 1959, by Elliot Berman and John E. G. Taylor
Serial No. 827,463, filed July 16, 1959, by Elliot Berman and David B. McQuain
Serial No. 827,719, filed July 17, 1959, by Elliot Berman and David B. McQuain United States Patents Nos. 2,800,457 and 2,800,458, to which reference has been made, mention film-forming material which can be substituted for the gelatin and gum arabic given as specific examples here for capsule wall material. The capsule structure is unique in that it keeps the dye material of a coating, whether in the colorless state or in the colored state, from migrating in the film, which migration may not be desirable for a particular application of the invention. The capsules give very good definition to the displayed data, as there is no solid and continuous medium to transmit, by internal diffusion, "writing" or "erasing" light beyond the borders intended.

CONTINUOUS FILM COATING WITH LIQUID DROPLET INCLUSIONS

Example II

In this species of the invention, the water-immiscible liquid dye solution is emulsified as the internal phase in an aqueous sol of a film-forming polymer material, natural or artificial, such as that described in United States Patent No. 2,374,862, which issued May 1, 1945, on the application of Barrett K. Green, that patent disclosing a liquid ink dispersed in a continuous gelatin film as microscopic droplets, whereas in this invention the liquid droplets are solutions of photochromic dyes. Such liquid droplets may at temperatures at which the screen is used, even at room temperature, become solid solutions. As a specific example of such a continuous film coating, an emulsion is made with an external phase consisting of, in parts by weight, gelatin 20, saponin (as an emulsifying agent) 1, and water 79, and, as an internal phase, paraffin oil (viscosity 140–160 Saybolt at 40 degrees centigrade), chlorinated diphenyl (54 percent chlorine content) 50, and 3 percent, by weight, of the chlorinated diphenyl content, of the 6′-nitro-spiropyran derivative, specified as superior in the case of the capsule coating of Example I. This emulsion is made at a temperature sufficient to keep the gelatin-containing continuous phase as a liquid sol, and such emulsion may be coated on a transparent or translucent support sheet and solidified by cooling, leaving the internal phase as a profusion of microscopic droplet entities throughout a substantially transparent continuous film.

It will be apparent at this point that one side of a support sheet may be coated with the capsule type of coating of Example I, while the other side may be coated with the continuous film structure just described as Example II, each having its own characteristics dictated by the mobility or immobility of the dye solution, and by the effect of side-diffusion of applied "writing" or "erasing" light, or by diffusion characteristics of applied viewing light. Also, the coatings of Examples I and II may be made one on top of the other.

It is apparent that any film-forming polymer that is the equivalent of gelatin may be used, such as methyl cellulose, carboxy-methyl-cellulose, and polyvinyl alcohol.

CONTINUOUS PLASTICIZED COATING FILM

Example III

In this form of the invention, the selected dye is dissolved in a film-forming material that dries or solidifies on a transparent or translucent support sheet as a solid solution which has not the discrete entity liquid solution inclusions as in the capsule or emulsion continuous coatings, such as those which have been described in Examples I and II. As a specific example, the selected dye is mixed with the solvent cellulose-acetate-butyrate with the aid of a solvent mixture of toluene, ethanol, and acetone, the latter three of which are evaporable, coating the resulting solution onto a sheet of support material and allowing it to dry. Specifically, 3 percent, by weight, of the 6′-nitro derivative of the spiropyran parent compound, structurally given before, is dissolved in a mixture of 600 grams of cellulose-acetate-butyrate, 200 grams of trichlorodiphenyl, 512 grams of toluene, 128 grams of ethanol, and 160 grams of acetone. The cellulose-acetate-butyrate preferably used has a butyryl content of 13 percent, a nominal combined cellulose content of 50 percent, and a free hydroxyl content of 2 percent in the cellulose residue—having a viscosity of 0.5 second by ASTM D–1343–54T procedure. This solution may be coated on the supporting transparent or translucent sheet, and dried. A thick film may be produced by additional coatings to get the required thickness. This coating turns blue when "written" on by ultraviolet light. If tributyl citrate is used instead of trichlorodiphenyl, the "writing" will be red.

SELF-SUPPORTING SOLID SOLUTION SCREEN

Example IV

In this form of the invention, a solution is formed of film-forming resin or polymer in which the selected photochromic dye is dissolved. In a first example, a solution is made as in the previous Example III except that instead of using the relatively soft trichlorodiphenyl, which nears the viscosity of an oil, there is used a more rigid solvent material, such as heptachlorodiphenyl, which is rigid enough at room temperature to be self-supporting if the dried solution is cast to a thickness of, say, several thousandths of an inch.

For a specific formulation, the 6′-nitro-spiropyran compound, whose formula has been given before, is dissolved to the extent of 3 percent, by weight, in dioctyl phthalate. Fifty percent of this dye solution is mixed with powdered polyvinyl chloride to form a plastisol. This plastisol, deaerated, is poured into a flat pan, which acts as a mold, and the pan and its contents are heated to 350 degrees Fahrenheit until a clear gel is formed. This, when cooled, forms a self-supporting sheet. A sheet of this material one eighth of an inch thick is substantially self-supporting and will serve as one of the layers of the novel screen. When "written" on by ultraviolet light, this screen turns purple. The effect of the solvent on the hue of the colored form has been explained before.

CAPILLARY SCREENS THE FREE AREAS OF WHICH HOLD, BY CAPILLARY ACTION, LIQUID SOLUTIONS OF THE LIGHT-RESPONSIVE DYES

In FIG. 11 is shown a square-woven, interlocked or knit, support 89, having a capillary open areas 81, which hold a liquid solution of the selected photo-responsive dye and which may form one of the layers of the novel display screen. The support 80 may be woven in any configuration desired, such as diamond, triangular, or the like, and its warp and woof filaments may be of different materials, colored differently or being black, and, moreover, the warp or woof filaments, or the knit filaments, may themselves be differentially responsive to "writing" and "erasing" light, as would be the case if the filaments were solid solutions of the selected dye or dyes. The filaments may be chosen for their light-reflective or light-refractive characteristics to contrast or blend with the "writing" or "erasing" data contained in the liquid areas.

The screen form is adapted for "erasing" by using blotting paper to remove the liquid, by rolling or squeegeeing it, by blowing the liquid out of the free areas, by dipping it in washing liquids, or replacing photo-responsive liquids, or by evaporation of the solvent if it be of an evaporable nature at ambient temperature or at an artificially-raised temperature. Polyvinyl chloride fibers plasticized with photo-responsive dye solutions may be used for the web, or, in other cases, absorptive fibers or filaments may be used for the same purpose. If the screen is not to be colorable by "writing" light, it may be treated to be reflective of visible light to give the "writing" or "erased" data a significant background for contrast in viewing light.

Figure 12:
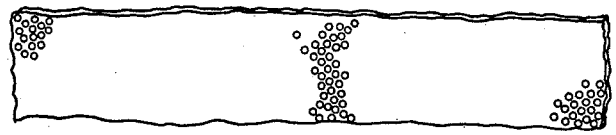
FIG. 12 is a diagrammatic showing, in perspective, of a translucent screen layer having randomly-disposed pores in which may be held a liquid solution of the selected photochromic dye.
Figure 13:
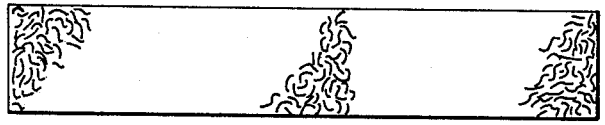
FIG. 13 is a diagrammatic showing, in perspective, of a translucent fibrous screen layer, the interstitial spaces of which may hold a liquid solution of the selected dye.

In FIGS. 12 and 13 are shown, respectively, a perforated or porous support, which is preferably translucent and which holds in the interstitial capillary areas or holes the liquid dye solutions selected for use, and a fibrous material such as paper or felt, which serves a similar purpose.

Figure 14:
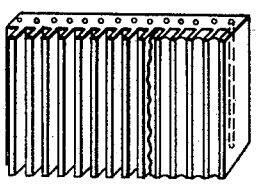
FIG. 14 is a diagrammatic showing, in perspective, of a translucent support having both internal capillary channels and an external capillary comb in which liquid photochromic dye solutions may be held.

FIG. 14 shows a screen support having parallel capillary pores or channels running therein or thereon, which may hold the liquid dye solutions.

Although the 6′-nitro-spiropyran deravative compound, used as exemplary in Examples I, II, III, and IV, is preferred because of its remarkably fine behavior as to color change when dissolved in polar and non-polar solvents, there are many compounds in the patent applications disclosed herein that may even surpass it for a given application.

Also, the naming of any particular materials in this specification is not to be deemed as limitations on the invention, as the characteristics of the materials have been defined and many examples mentioned or referred to. The basic invention is a fabricated display screen, the parts of which are in certain cooperating relation to produce a visual effect when illuminated by viewing light, the effect being modified by "writing" and "erasing" light, and by ambient temperature.

The invention will be claimed both broadly and specifically with reference to particular materials.

What is claimed is:

1. A display screen having two viewable layers arranged one behind the other in contiguous relation with at least one transparent support, the spatial relation between said layers being variable from a contiguous position to a slightly spaced-apart position, each layer including a solution of at least one photochromic spiropyran dye material which, when exposed to "writing" light predominating in components from blue into the ultraviolet wavelengths, changes from a normally essentially colorless state to a distinctively and visibly colored state.

2. The display screen of claim 1 in which the transparent support sheet transmits visible and infrared light.

3. The display screen of claim 1 in which an infrared light filter is positioned between the layers.

4. The display screen of claim 1 in which the support sheet transmits light from the ultraviolet into the infrared region of the light spectrum.

5. The display screen of claim 1 having a light-transparent support sheet with the two layers on one side thereof in the form of coatings.

6. The display screen of claim 1 having a light-transparent support sheet and the two layers coated thereon, one on each surface of said support sheet.

7. A transparent display screen consisting of a sheet of transparent support material coated on one side with a solution of a photochromic spiropyran dye which assumes a visible color where exposed to light predominating in wave lengths from the blue and into the ultraviolet region of the spectrum, and coated on the other side with a solution of a different photochromic spiropyran dye which assumes a different visible color when exposed to light predominating in wave lengths from the blue into the ultraviolet region of the spectrum.

8. A transparent display screen consisting of two self-supporting transparent sheets, arranged one behind the other, said sheets consisting of a solid solution of film-forming material and a photochromic spiropyran dye, each sheet normally being colorless but attaining a distinctive color when directly exposed to "writing" light predominating in wavelengths in the blue through ultraviolet region of the spectrum, the "writing" light being absorbed in the colored areas of either sheet.

9. The display screen of claim 8 in which the sheets are adjacent but not in contact with each other.

10. The display screen of claim 8 in which a light filter is positioned between the sheets.

11. A transparent display screen formed in part of at least two layers, arranged one behind the other, said layers being disposed on at least one transparent support, each layer including a normally colorless solution of a photochromic spiropyran dye which assumes a colored state when subjected to "writing" light predominating in wavelengths in the region of the spectrum including blue and ultraviolet, and an uncolored state when said colored solution is subjected to "erasing" light which predominates in wavelengths of the spectrum extending from green into the infrared region of the spectrum.

12. A transparent display screen consisting of two layers of transparent material, arranged one behind the other, disposed on at least one transparent support, the spatial relation between said layers being variable from contiguous position to a slightly spaced-apart position, each layer comprising a solution of a photochromic spiropyran dye which assumes a colored state when subjected to "writing" light predominating in wavelengths in the region of the spectrum including blue and ultraviolet and an uncolored state when said colored solution is subjected to "erasing" light which predominates in wavelength of the spectrum extending from green into the infrared region of the spectrum, the dye solution of at least one of the layers being a liquid contained in microscopic capsules, the walls of which transmit "writing" and "erasing" light.

13. The screen of claim 12 in which the layers are supported on a sheet which transmits visible light and "erasing" light and at least one of the sides being coated with the dye-solution-containing capsules.

14. The screen of claim 12 in which the layers are supported on a sheet which transmits visible light and "erasing" light and at least one of the sides being coated with a continuous translucent film containing microscopic liquid inclusions of one of the dye solutions.

15. A data display device including a screen to be viewed, said screen having at least two superposed layers of different photochromic spiropyran compounds in solution disposed thereon, each of said spiropyran compound in solution having a distinctively "colored" state and a distinctive rate at which the colored form fades by reason of the ambient temperature.

16. A display screen having two viewable layers one behind the other but not necessarily in contact, said layers providing photochromic dye means for making separate images on independently-selected areas of each of said layers, each layer including a solution of a photochromic spiropyran dye which, when exposed to "writing" light predominating in from blue into the ultraviolet wavelengths changes to a distinctive colored state, said layers being supported on a light-diffusing screen upon which an image may be projected to form a background against which the "writing" made on the layers of the screen may be seen more plainly.

17. The display screen of claim 12 wherein at least one of the layers consists of a coating on a supporting web, the coating consisting of microscopic capsules each containing a solution of the dye, the walls of each capsule having a diffusing effect on the incident visible light to give a contrasting effect by which the colored state of the dye solution is accentuated.

18. The display screen of claim 17 in which the supporting web is a ground glass sheet.

19. A flexible sheet of polymer film material that transmits light in that region of the light spectrum including the ultraviolet through infrared, said sheet including a photochromic spiropyran dye which has a normally substantially colorless state switchable, by being subjected to light predominating in the blue and ultraviolet components of the light spectrum, to a distinctive colored state, said flexible sheet being coated with a layer of translucent flexible adhesive having therein in dissolved form another photochromic spiropyran dye, also normally substantially colorless, which changes to a distinctively colored state when subjected to light predominating in the blue and ultraviolet components of the light spectrum.

20. The sheet of claim 19 in which the colored state of the dye in the flexible sheet is of different hue from the colored state of the dye in the adhesive coating.

21. A stack of display screen devices, each device consisting of a combination of two facing layers of material, each of the layers being associated with an adjacent transparent support and each capable of transmitting visible light and infrared light, said layers including a solution of a photochromic spiropyran dye material that has a normally colorless state changeable to a colored state by exposure to "writing" light predominating in the wavelengths identified with the blue and ultraviolet light region of the light spectrum, one of the layers of each screen being of adhesive material having a tackiness sufficient to hold the screens together but insufficient to prevent removal of each layer.

22. A display screen device consisting of the combination of at least two facing layers of material, said layers being disposed on at least one contiguous transparent support, the spatial relation between said layers being variable from a contiguous position to a slightly spaced-apart position, at least one of the layers comprising a profusion of minute droplets of liquid solutions of photochromic spiropyran dye material locked up in minute capsules, the capsules being a mixture of those containing different spiropyran dye solutions, each of which solutions has a distinctive color when subjected to light radiation extending from the blue into the ultraviolet region of the light spectrum.

23. An optical screen consisting of at least two adherent layers which may be physically parted and handled separately, at least one of said layers being superposed over a transparent support, each layer being characterized by being able to transmit visible light, and each layer comprising a solution of a photochromic spiropyran dye material that has a normally colorless state which is changed to a colored state by exposure to "writing" light predominating in the wavelengths identified with the blue and ultraviolet region of the light spectrum.

24. The device of claim 22 in which the various dye solutions have different thermal fade rates in the colored form.

25. A display screen device consisting of at least two layers, said layers providing photochromic dye means for making separate images on independently-selected areas of each of said layers, each layer comprising a solution of a photochromic spiropyran dye which when subjected to "writing" light in the green through ultraviolet region of the spectrum turns to a distinctive color, one of the layers consisting of a support having a profusion of pores in which the dye solution associated therewith is retained and the other layer being deposited on a transparent support positioned in contiguous relation with said one layer.

26. The display screen of claim 25 in which the porous layer is a mesh of woven filaments.

References Cited in the file of this patent

UNITED STATES PATENTS

| | | |
|---|---|---|
| 821,200 | Szczepanik | May 22, 1906 |
| 2,213,745 | Schinzel | Sept. 3, 1940 |
| 2,335,465 | Vieling | Nov. 30, 1943 |
| 2,735,783 | Tamblyn | Feb. 21, 1956 |
| 2,800,457 | Green | July 23, 1957 |
| 2,953,454 | Berman | Sept. 20, 1960 |